March 13, 1956  E. A. HERIDER ET AL  2,737,666
COIL SPRING RETAINER AND ASSEMBLY
Filed Feb. 14, 1955  3 Sheets-Sheet 1

INVENTORS.
Elmer A. Herider
Jimmie James
BY
THEIR ATTORNEYS

March 13, 1956 E. A. HERIDER ET AL 2,737,666
COIL SPRING RETAINER AND ASSEMBLY
Filed Feb. 14, 1955 3 Sheets-Sheet 2

INVENTORS.
Elmer A. Herider
Jimmie James
BY
THEIR ATTORNEYS

March 13, 1956  E. A. HERIDER ET AL  2,737,666
COIL SPRING RETAINER AND ASSEMBLY
Filed Feb. 14, 1955  3 Sheets-Sheet 3

INVENTORS.
Elmer A. Herider
Jimmie James
BY
THEIR ATTORNEYS

United States Patent Office 2,737,666
Patented Mar. 13, 1956

2,737,666

COIL SPRING RETAINER AND ASSEMBLY

Elmer A. Herider, Dearborn Township, Wayne County, and Jimmie James, Detroit, Mich., assignors to Rockwell Spring and Axle Company, Coraopolis, Pa., a corporation of Pennsylvania Application February 14, 1955, Serial No. 488,088

6 Claims. (Cl. 5—264)

This invention relates to a coil spring retainer and assembly. According to known methods, a coil spring is placed on a base or supporting plate provided with tongues or lugs and thereafter the lugs or tongues are bent around the base coil of the coil spring. This requires considerable time and in some cases the use of special tools for bending the lugs around the base coil. These disadvantages are overcome in accordance with our invention. We provide means for securing the base coil of a coil spring to a retainer whereby the coil spring can be secured to the retainer merely by slipping the coil spring in place without the necessity of bending any lugs or other fastening means after the coil spring is in place.

In the accompanying drawings which illustrate a preferred embodiment of our invention, Figure 1 is a partial plan view of a spring assembly;

Figure 1:
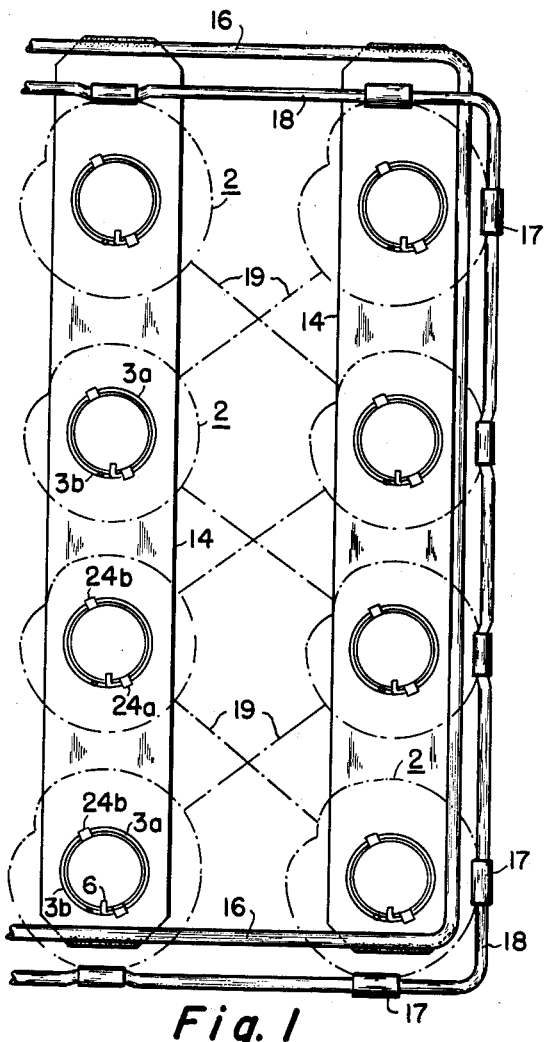
Figure 2:
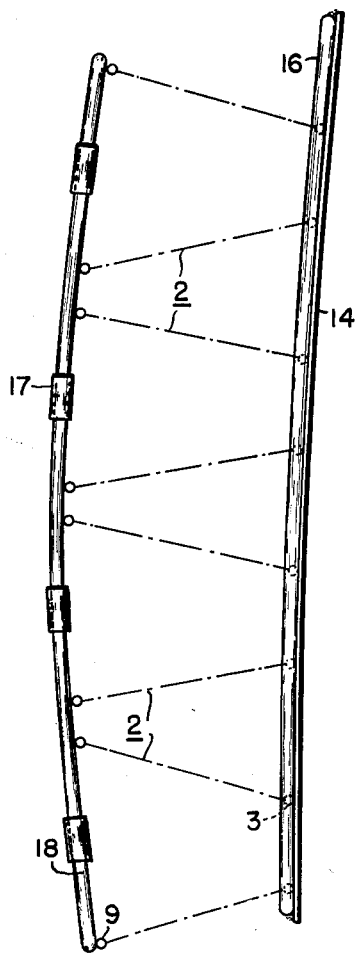
Figure 2 is a side elevation of the structure shown in Figure 1.
Figure 5:
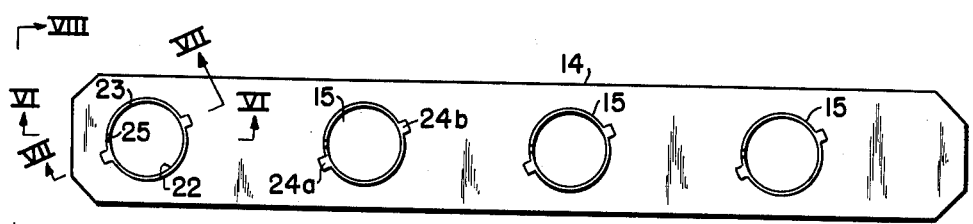
Figure 5 is a plan view of a base or supporting plate and retainers for supporting and retaining the coil springs.
Figure 3:
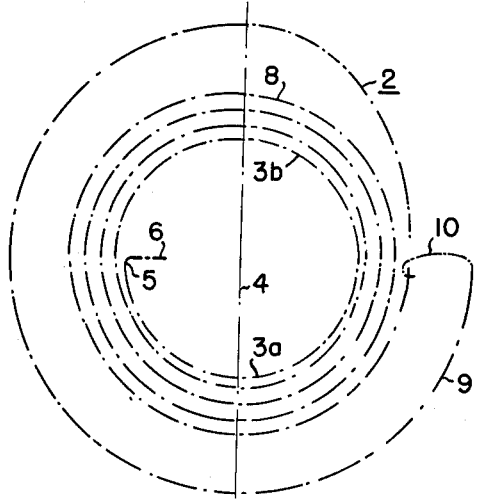
Figure 3 is a diagrammatic plan view of a coil spring.
Figure 4:
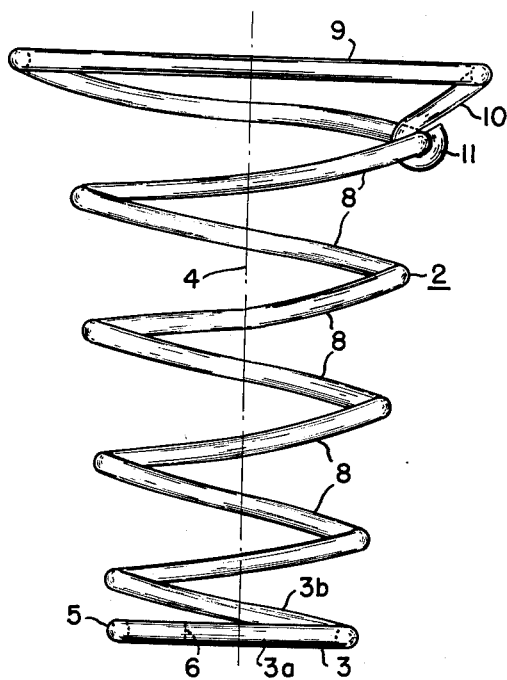
Figure 4 is a side elevation of the coil spring shown in Figure 3.
Figure 8:
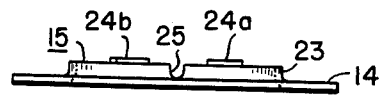
Figure 8 is an enlarged end elevation taken on the line VIII—VIII of Figure 5.
Figure 6:
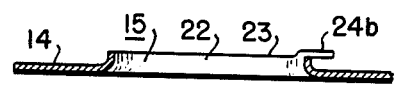
Figure 6 is an enlarged vertical section taken on the line VI—VI of Figure 5.
Figure 7:
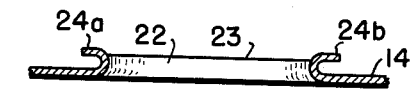
Figure 7 is an enlarged vertical section taken on the line VII—VII of Figure 5.

Referring more particularly to the accompanying drawings, a coil spring is shown in Figures 3 and 4, this coil spring being of the knotted cone type. The invention is equally applicable to other types of coil springs, for instance, to coil springs of the hourglass type, the spool type, the cylindrical type, the oval type, or the intermediate oval type. This coil spring indicated generally by reference numeral 2 has a base coil indicated generally by reference numeral 3 and comprises two portions 3a and 3b. Each of these portions constitutes approximately one-half of the base coil 3. The portion 3a lies in a plane which is perpendicular to the longitudinal axis 4 of the spring whereas the portion 3b lies in a plane which is inclined with respect to such axis. The portion 3a at its end 5 is bent inwardly to form an anchoring portion 6 for cooperation with a retainer hereinafter described, which retainer is integral with a base plate on which the spring is supported. The spring has intermediate coils 8 and a top coil 9 having an end 10 which is bent downwardly and hooked around the adjacent coil 8 as indicated at 11 for retaining the top coil 9 in a plane which is substantially perpendicular to the longitudinal axis 4 of the spring.

Referring to the other figures of the drawings, a plurality of coil springs 2, for instance, four coil springs as shown in the drawings, is mounted on a base plate 14, the lower coil 3 of each spring being secured to the base plate by a retainer indicated generally by reference numeral 15. The base plates 14 are welded at their ends to a base frame 16 which may be mounted on any suitable support not shown. The upper coils 9 are secured by clips 17 to a top border wire 18. The various coil springs 2 are interconnected by ties 19 in the usual manner.

The retainer for retaining the bottom coil 3 of each coil spring 2 on the base plate 14 will now be more particularly described. The base plate 14 is provided with an opening 22 at each of the places where it is desired to support a spring. Each of the openings is provided with a surrounding upstanding flange 23, the flange and opening corresponding in shape and size approximately to the shape and size of the base coil 3 of the coil spring. Thus, in the present instance, since the base coil 3 is circular, the opening 22 and the flange 23 are circular. Two lugs 24a and 24b are formed integrally with the flange 23 and extend outwardly from the top edge of the flange. These lugs are spaced around the flange substantially 180 degrees and are spaced from the plate 14 a distance substantially equal to the diameter of the wire used in forming the coil spring. The flange 23 is provided with an opening 25 extending through it, this opening preferably being an upwardly opening slot.

Figure 9:
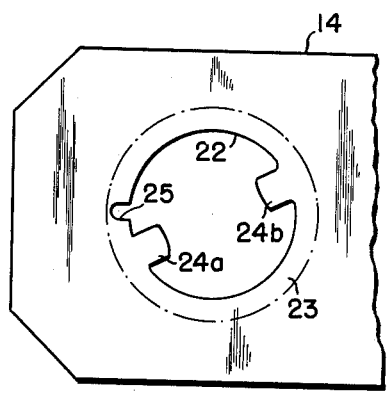
Figure 9 is a partial plan view of a base plate having a hole punched therein, from which the upstanding flange and retaining lugs hereinafter referred to may be formed by suitable drawing and bending operations.
Figure 10:
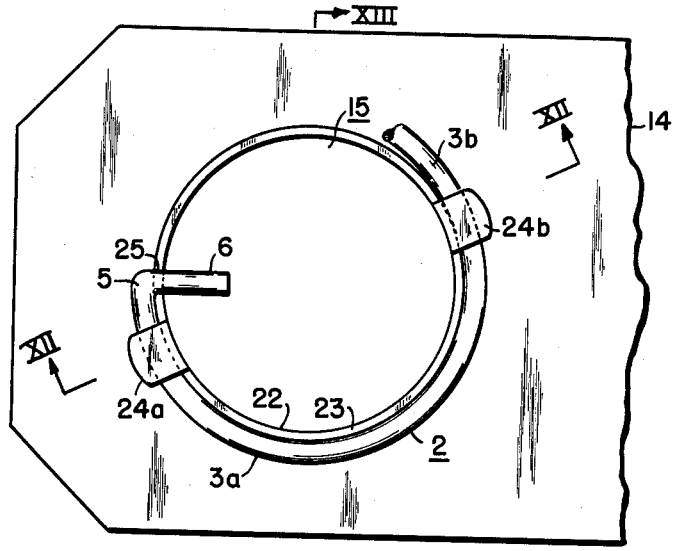
Figure 10 is a partial plan view of an assembly of a retainer and spring.
Figure 11:
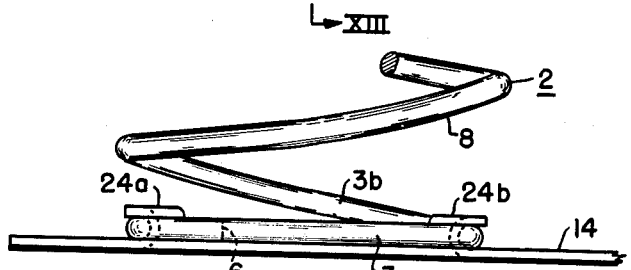
Figure 11 is a side elevation of the assembly shown in Figure 10.
Figure 12:
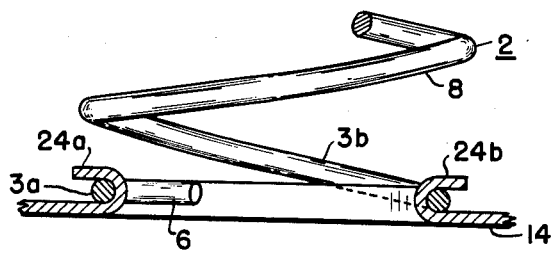
Figure 12 is a vertical section taken on the line XII—XII of Figure 10.
Figure 13:
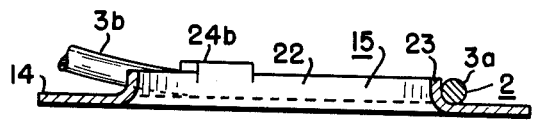
Figure 13 is a vertical section taken on the line XIII—XIII of Figure 10.

In the illustrated embodiment of the invention, the lugs 24a and 24b are formed integrally with the upstanding flange 23 but the lugs could be formed separately and then joined as by welding to the flange. The upstanding flange 23 could also be formed separately and then joined as by welding to the base plate 14. One suitable method of forming the lugs 24a and 24b integrally with the flange 23 by drawing and bending operations will now be described with reference to Figure 9. An opening 22 is stamped from the plate 14, the opening being circular except for the lug portions 24a and 24b and the slot 25. The portion 23 is formed by a drawing operation to provide the upstanding annular flange 23. The lug portions 24a and 24b are then bent outwardly to form the lugs 24a and 24b.

The coil spring 2 is secured to the retainer 15 in the following manner, as shown more particularly in Figures 10-13. The anchoring portion 6 of the base coil 3 is located in the slot 25 in the flange 23, the anchoring portion 6 being long enough for easy assembly, with the portion 3a lying outside of lug 24a. The portion 3a is then placed under lug 24a and the portion 3b is forced under lug 24b. This operation securely locks the coil spring in place on the retainer. The coil springs can be readily removed from the retainer by reversing the steps just described.

The invention is not limited to the preferred embodiment but may be otherwise embodied or practiced within the scope of the following claims.

We claim:

1. A retainer for a coil spring, which comprises a plate adapted to support the spring, said plate having an upstanding flange surrounding an opening in the plate and conforming substantially in size and shape to the base coil of the spring, said flange having an opening extending through it for receiving an anchoring portion of the base coil of the spring, said flange having outwardly extending lugs spaced around it and spaced from the plate for retaining the base coil of the spring.

2. A retainer according to claim 1, wherein two lugs are spaced around the flange at approximately 180 degrees from each other.

3. A retainer according to claim 1, wherein two lugs are spaced around the flange at approximately 180 degrees from each other and wherein both lugs are spaced from the plate a distance substantially equal to the diameter of the wire from which the base coil of the spring is made.

4. A coil spring and retainer assembly comprising a coil spring having a base coil adapted to be secured to a retainer, a part constituting substantially one-half of the base coil lying in a plane which is perpendicular to the longitudinal axis of the spring, said part at its free end having an inwardly bent anchoring portion, the retainer comprising a plate having an upstanding flange surrounding an opening in the plate and conforming substantially in size and shape to the base coil of the spring, said flange having an opening extending through it for receiving the anchoring portion of the base coil of the spring, said flange having outwardly extending lugs spaced around it and spaced from the plate for retaining the base coil of the spring.

5. A coil spring and retainer assembly according to claim 4, wherein two lugs are spaced around the flange at approximately 180 degrees from each other.

6. A coil spring and retainer assembly according to claim 4, wherein two lugs are spaced around the flange at approximately 180 degrees from each other and wherein both lugs are spaced from the plate a distance substantially equal to the diameter of the wire from which the base coil of the spring is made.

References Cited in the file of this patent

UNITED STATES PATENTS

| 393,984 | Johnson | Dec. 4, 1888 |
| 837,751 | Summers | Dec. 4, 1906 |
| 1,275,318 | Stevens | Aug. 13, 1918 |

FOREIGN PATENTS

| 321,211 | Great Britain | Nov. 4, 1929 |